W. W. GLIDDEN.
PIPE FITTING.
APPLICATION FILED AUG. 23, 1906.
918,843.  Patented Apr. 20, 1909.
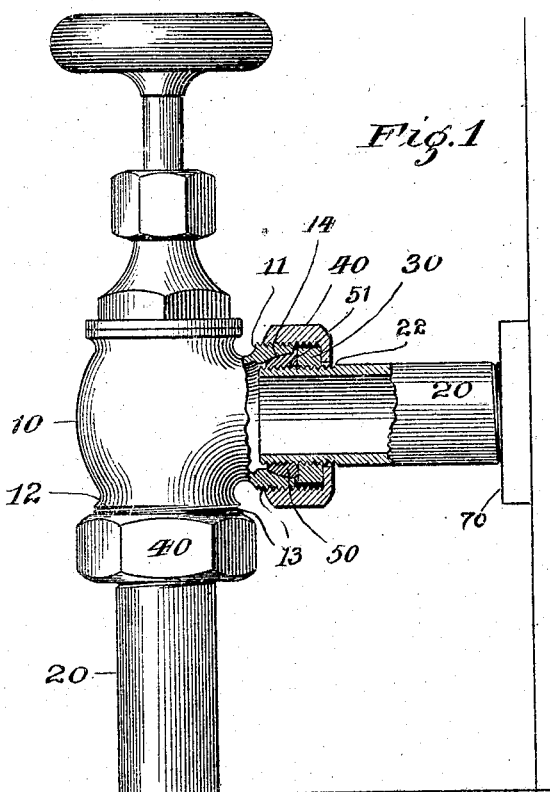
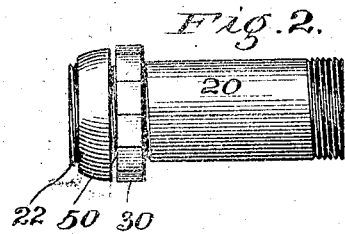
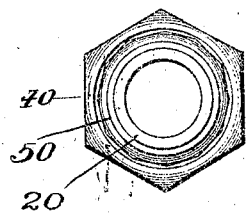
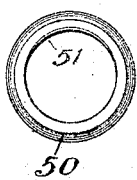
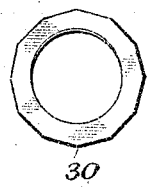
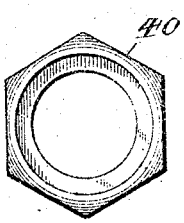
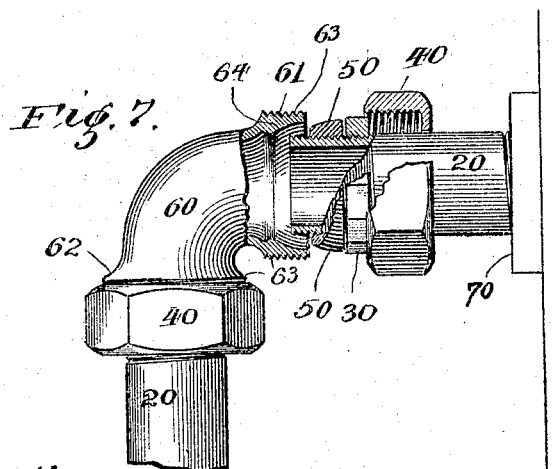
Witnesses:
Inventor:
Wilmot W. Glidden,
by Charles C. Shurey,
Atty.

UNITED STATES PATENT OFFICE.

WILMOT W. GLIDDEN, OF OAK PARK, ILLINOIS.

PIPE-FITTING.

No. 918,843.

Specification of Letters Patent.

Patented April 20, 1909.

Application filed August 23, 1906. Serial No. 331,681.

*To all whom it may concern:*

Be it known that I, WILMOT W. GLIDDEN, a citizen of the United States, residing in the city of Oak Park, in the county of Cook and State of Illinois, have invented certain new and useful Improvements in Pipe-Fittings, of which the following is a full, clear, and exact description.

My invention relates to certain new and useful improvements in pipe fittings, such as valves, elbows and the like, and designs to provide a fitting of this type for coupling together two angularly disposed pipes or nipples without much, if any, substantial distortion or deflection of the pipes or nipples.

One object of the invention is to provide a fitting of this class with one or more adjustable couplings of peculiar construction, whereby the fitting may be secured upon two angularly disposed pipes or nipples which are not perfectly lined-up.

Another object of the invention is to produce a fitting which will greatly reduce the amount of time and labor required to set up radiators or other like devices in which close work is an important factor.

In connecting a radiator with a valve or elbow, it is customary for the workman to take measurements, cut the nipple and thread the ends thereof. The nipple is cut a little longer than the distance between the parts to be connected, to provide for the thread and this additional amount is mostly guess-work, so that it frequently happens that after screwing the parts together, the nipple is found to be too short or too long, and another one has to be cut so as to produce one of the correct length. Furthermore, it frequently happens that the adjacent ends which are to be connected with the fitting do not line-up and then it often happens that in screwing the fitting on, the threads are stripped and the fitting has to be discarded.

It is the aim of this invention to correct these undesirable features without adding much if anything to the cost of the fitting itself, and to such end this invention consists in certain novel features of construction and arrangement, a description of which will be found in the following specification and the essential features more particularly defined in the appended claims.

The invention is clearly illustrated in the drawings furnished herewith in which—

Figure 1 is a side view of a valve fitting containing my invention and two nipples connected therewith, certain of the parts being broken out to illustrate the construction of one of the adjustable union couplings. Fig. 2 is a side view of one of the nipples with certain members of the coupling threaded thereon. Fig. 3 is an end view of the parts seen in Fig. 2 with the addition of the coupling nut. Fig. 4 is an end view of a compressible washer used in the coupling. Fig. 5 is an end view of an adjustment nut. Fig. 6 is an end view of the coupling nut and Fig. 7 is a side view showing the invention applied to a union elbow fitting.

Referring to the drawings, 10 represents the body of an ordinary radiator valve, which contains suitable mechanism for controlling the passage of steam or hot water. Valves of this kind are placed quite close to the floor and to the radiator and are frequently in such a peculiar position as to make the connection with the radiator and steam pipe very difficult. This is especially the fact where the stub or nipple from the main pipe extends up through a tile or cement floor and is practically fixed so as to have no lateral or longitudinal movement. The valve is provided with two bosses 11, 12, one or both of which may be arranged to be connected up with the pipes or nipples by a union coupling of peculiar construction. An external screw thread 13, is formed on each boss for engagement with a coupling nut 40, and each boss may be provided with an internal flaring seat 14. This flaring seat may be concave in form if desired and is arranged to receive a compressible washer for making a tight joint between the fitting and the pipe. The nipples 20 which are to be connected up with the valve are threaded on both ends and one is screwed into the boss 70, of the radiator and the other into the service pipe (not shown). The nipples should be of such length as to extend well up into the bosses 11, 12, but no accurate measure of the pipes is required when this improved fitting is employed. An adjusting nut 30, is threaded upon the threads 20, of each of the nipples and beyond said nut is a compressible washer 50, preferably formed of soft metal, which washer contains an internal screw thread 51, by means of which it can be threaded upon the nipple. The washer is conical in form with a convex surface of somewhat greater diameter than the concave seat 13, in the boss, whereby when the parts are connected up the washer will be compressed to fill up any irregularities which may happen to be present in the seat and it will be crowded down tightly upon the screw threads 22, of the nipple 20, to prevent leakage.

Fig. 7 shows two union couplings applied to a union elbow 60, the bosses 61, 62 of which are provided with external screw threads 63, for connection with the coupling nut 40. Said bosses are also provided with flaring seats 64, for the soft metal washers. In this figure the connection is shown as having been made between the elbow and one nipple, while the other one is in a disconnected condition. In this case the horizontal nipple 20, has been cut a little short, but its use is still possible because the soft metal washer can be moved along the same until it is screwed into the seat in the boss and crowded into place by the adjustment nut 30, after which the connecting nut 40 can be screwed up to complete the joint.

In connecting up this improved fitting with two angularly disposed pipes or nipples the latter are first cut to size, threaded and screwed into the service pipe and the boss 70, of the radiator, the soft metal washers, adjustment nuts and connecting nuts being then placed upon the nipples. The fitting proper, is then put in position with the bosses surrounding the pipes or nipples, and the soft metal washers are then screwed along the nipples and into the seats in the bosses. The adjustment nuts 30, are then screwed up to crowd the soft metal washers into place in their seats, after which the coupling nuts are screwed up tight to connect and hold the parts together. In this way the fitting can be trued up with respect to the two pipes that are to be connected, before the parts are crowded together by the coupling nut. In the ordinary fitting, the coupling nut draws together the two parts to be coupled, thereby distorting said parts from their normal position and often stripping the threads or otherwise causing leaks in the joint. In this fitting the coupling nuts merely clamp the parts together, inasmuch as the soft metal washers are first screwed into their seats in the fitting, without disturbing the pipes to any perceptible degree. If the coupling nuts be screwed up tightly it will obviously crowd the soft metal washers upon their seats and the screw threads of the nipples, thus making a perfect fit between the two parts to be connected up. Inasmuch as the soft metal washer is threaded upon the nipple, very little tightening of the coupling will be necessary and only enough pressure need be applied to cause a firm contact between the soft metal washer and the parts with which it engages. The seat being concave allows the soft metal washer to seat itself upon the seat although the two parts are not in perfect alinement and the washer will not slip out nor be sprung out of its seat before the backing and coupling nuts are screwed home. The adjustment nut 30, acts as a backing for the soft metal washer and provides a connection between the nipple and the connecting nut, whereby the parts may be firmly clamped together.

I claim as new and desire to secure by Letters Patent:

1. In a device of the class described, the combination with two angularly disposed pipes screw threaded upon their adjacent ends, of a fitting having two angularly disposed, externally screw threaded bosses formed with internal flaring seats arranged to surround the adjacent ends of said pipes, compressible washers threaded upon the ends of said pipes and adapted to be screwed along the same and into said seats, backing nuts threaded upon said pipes behind said compressible washers and coupling nuts threaded upon said bosses and engaging the backing nuts to crowd said washers upon the seats.

2. In a device of the class described, the combination with two angularly disposed pipes screw threaded upon their adjacent ends, of a fitting having two angularly disposed, externally screw threaded bosses formed with internal concave seats arranged to surround the adjacent ends of the pipes, compressible washers having spherical bearing surfaces threaded upon the ends of said pipes and adapted to be screwed along the same and into said concave seats, coupling nuts threaded upon said bosses and engaging the backing nuts to crowd said washers upon the seats in the bosses.

3. In a device of the class described, the combination with two angularly disposed pipes screw threaded upon their adjacent ends, of a fitting having two angularly disposed, externally screw threaded bosses having internal concave seats arranged to surround the adjacent ends of the pipes, soft metal washers having convex bearing surfaces threaded upon the ends of said pipes and adapted to be screwed along the same into said concave seats, backing nuts threaded upon said pipes behind said soft metal washers and coupling nuts threaded upon said bosses for drawing the washers into the seats in the bosses.

WILMOT W. GLIDDEN.

Witnesses:
WM. P. BOND,
CHAS. O. SHERVEY.